(12) United States Patent  (10) Patent No.: US 8,358,287 B2
Chuang et al.  (45) Date of Patent: *Jan. 22, 2013

(54) SENSING STRUCTURE AND DISPLAYER COMPRISING THE SAME

(75) Inventors: Kai-Cheng Chuang, Tainan (TW); Sung-Hui Huang, Sijhih (TW)

(73) Assignee: E Ink Holdings Inc., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/421,637

(22) Filed: Mar. 15, 2012

(65) Prior Publication Data

US 2012/0169645 A1 Jul. 5, 2012

Related U.S. Application Data

(63) Continuation of application No. 12/353,487, filed on Jan. 14, 2009, now Pat. No. 8,164,579.

(30) Foreign Application Priority Data

Nov. 3, 2008 (TW) .................................. 97142376 A

(51) Int. Cl.
*G06F 3/045* (2006.01)
(52) U.S. Cl. ........................................ 345/174; 345/173
(58) Field of Classification Search .................. None
See application file for complete search history.

(56) References Cited

U.S. PATENT DOCUMENTS

| 7,019,734 B2 * | 3/2006 | Cross et al. | 345/173 |
| 8,164,579 B2 * | 4/2012 | Chuang et al. | 345/174 |
| 2003/0091254 A1 | 5/2003 | Mahling | |
| 2003/0142081 A1 * | 7/2003 | Iizuka et al. | 345/173 |
| 2005/0179673 A1 * | 8/2005 | Philipp | 345/173 |
| 2006/0176266 A1 | 8/2006 | Pak et al. | |
| 2008/0018611 A1 | 1/2008 | Serban et al. | |
| 2008/0117182 A1 * | 5/2008 | Um et al. | 345/173 |
| 2008/0122802 A1 | 5/2008 | Furuhashi et al. | |
| 2008/0136980 A1 * | 6/2008 | Rho et al. | 349/12 |
| 2008/0151133 A1 | 6/2008 | Kim et al. | |
| 2010/0053032 A1 | 3/2010 | Lai | |

FOREIGN PATENT DOCUMENTS

| CN | 1801067 A | 7/2006 |
| TW | M324212 | 12/2007 |
| TW | M339028 | 8/2008 |
| TW | 200837436 | 9/2008 |

OTHER PUBLICATIONS

Application and File History of U.S. Appl. No. 12/353,487, Inventor Kai-Cheng Chuang et al.., filed Jan. 14, 2009, now U.S. Patent No. 8,164,579 issued Apr. 24, 2012.

* cited by examiner

*Primary Examiner* — Lixi C Simpson
(74) *Attorney, Agent, or Firm* — Patterson Thuente Christensen Pedersen, P.A.

(57) ABSTRACT

A sensing structure and a displayer comprising the same are provided. The displayer further comprises a substrate and a panel disposed opposite to the substrate. The sensing structure comprises a plurality of sensing elements, a conductive assembly, and a process module. Each of the sensing elements has a position data corresponding to the panel. Every several adjacent ones of the sensing elements form a plurality of sensing areas. The process module is electrically connected to the sensing elements via the conductive assembly. Each of the sensing elements generates a touch voltage in response to a touch on the sensing areas. The process module receives the touch voltages, and calculates a touch position of the one touch corresponding to the panel according to the position data and the touch voltages.

17 Claims, 3 Drawing Sheets

SENSING STRUCTURE AND DISPLAYER COMPRISING THE SAME

The present application is a continuation application of U.S. patent application Ser. No. 12/353,487 filed on Jan. 14, 2009, which claims the benefit of priority based on Taiwan Patent Application No. 097142376 filed on Nov. 3, 2008, the disclosures of which are incorporated by reference herein in their entirety.

CROSS-REFERENCES TO RELATED APPLICATIONS

Not applicable.

BACKGROUND OF THE INVENTION

1. Field of the Invention

The present invention relates to a sensing structure and a displayer comprising the same. More specifically, the present invention relates to a sensing structure with a touch function and a displayer comprising the same.

2. Descriptions of the Related Art

Nowadays, touch displayers can be found almost everywhere in our daily life. As a device that can replace the conventional computer keyboard and mouse, a touch displayer allows a user to input instructions by touching a screen with a finger or a pen directly without need of a complex process. The most representative application is the so-called iPhone released by Apple Computer Inc., which provides the mobile phone users with a new operation interface by integrating a touch displayer into a mobile phone. Therefore, this product achieves remarkable sales performance immediately once it is released in the market.

Generally, technologies employed by common touch displayers roughly fall into the following categories: the resistive type, the capacitive type, the force-sensing type, the electromagnetic type and the acoustic wave type. Taking a force-sensing touch displayer as an example, sensors for sensing touches are typically disposed at four corners of the displayer to form a sensing area on the display panel. Once the sensing area is touched, the displayer can derive a touch position from information provided by the sensors disposed at the four corners and then make a corresponding response to accomplish the touch function. However, the touch displayer having the sensors disposed in this way only provides a single-touch function. Due to an insufficient number of sensors, the sensing accuracy is also unsatisfactory. Consequently, the aforesaid conventional structures can not satisfy modern people who have diversified and refined operational requirements on electronic products.

Furthermore, conventional display panels are generally suspended by a string or clamped by a gripper to form a space for receiving sensors between the display panel and the substrate. However, this conventional practice introduces a frictional force to the sidewall of the panel, which may adversely affect the accuracy of the sensing operation.

In summary, it is highly desirable in the art to overcome the limitation that the force-sensing touch displayer can only perform the single-touch function and to improve the accuracy of position sensing, thereby to meet consumers' operational demands on electronic products.

SUMMARY OF THE INVENTION

One objective of the present invention is to provide a sensing structure and a displayer comprising the same. With this sensing structure, the displayer can be provided with a multi-touch function and deliver improved sensing accuracy as compared to the conventional displayers.

To this end, the sensing structure of the present invention is for use in a displayer. The displayer comprises a substrate and a panel disposed opposite to the substrate. The sensing structure comprises a conductive assembly, a plurality of sensing elements and a process module. The sensing elements, each of which has a position data with respect to the panel, are disposed between the substrate and the panel. Every several adjacent ones of the sensing elements form a sensing area opposite to the panel, so as to form a plurality of sensing areas on the panel. The process module is electrically connected to the sensing elements via the conductive assembly. Each of the sensing elements generates a touch voltage in response to at least one touch on the sensing areas. The process module is configured to receive the touch voltages and calculate at least one touch position of the at least one touch opposite to the panel according to the position data and the touch voltages.

Further to this end, the displayer of the present invention comprises a substrate, a panel and a sensing structure. The panel is disposed opposite to the substrate. The sensing structure comprises a conductive assembly, a plurality of sensing elements and a process module. The sensing elements are disposed between the substrate and the panel and have position data with respect to the panel. Every several adjacent ones of the sensing elements form a sensing area opposite to the panel, so as to form a plurality of sensing areas on the panel. The process module is electrically connected to the sensing elements via the conductive assembly. Each of the sensing elements generates a touch voltage in response to at least one touch on the sensing areas. The process module is configured to receive the touch voltages, and calculate at least one touch position of the at least one touch opposite to the panel according to the position data and the touch voltages.

In summary, the sensing structure of the present invention has a plurality of sensing elements disposed between the panel and the substrate to form a plurality of sensing areas on the panel. Each of the sensing areas is adapted to receive at least one touch. With this arrangement, the displayer comprising the sensing structure is able to accomplish the multi-touch function and effectively improve the sensing accuracy, thereby overcoming the drawbacks that the conventional displayer only provides the single-touch function and delivers poor sensing accuracy.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments are not intended to limit the present invention to any specific environment, applications or particular implementations described in these embodiments. Therefore, description of these embodiments is only for purpose of illustration rather than to limit the present invention. It should be appreciated that, in the following embodiments and the attached drawings, elements unrelated to the present invention are omitted from illustration; and dimensional relationships among individual elements in the attached drawings are illustrated only for ease of understanding, but not to limit the actual scale.

Figure 1:
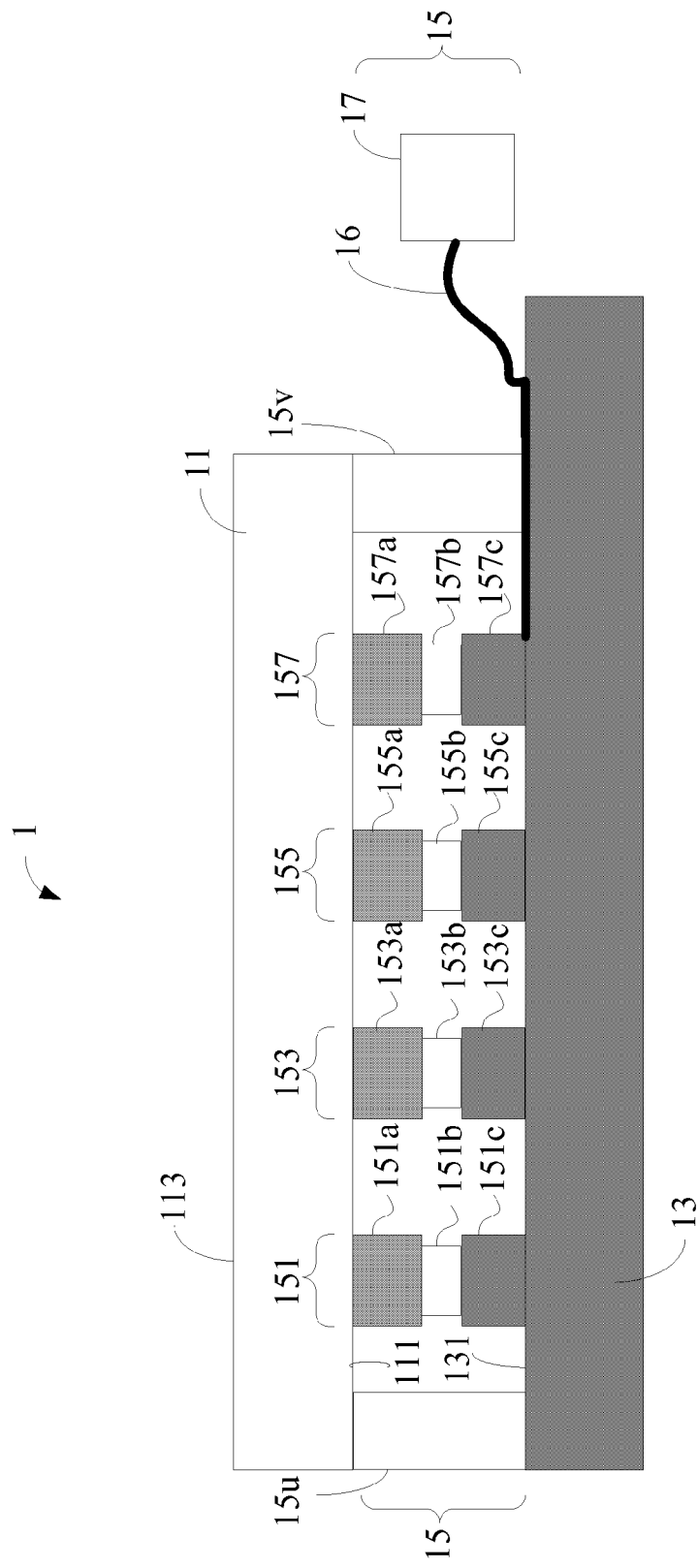
FIG. 1 is a side view of a display according to a first preferred embodiment of the present invention.

A first preferred embodiment of the present invention is illustrated in FIG. 1, which is a side view of a displayer 1. The displayer 1 comprises a panel 11, a substrate 13 and a sensing structure 15. The panel 11 has a first surface 111 and a second surface 113 corresponding to the first surface 111, and the substrate 13 has a substrate surface 131. The panel 11 is disposed opposite to the substrate 13 such that the first surface 111 of the panel 11 is opposite to the substrate surface 131.

Additionally, the sensing structure 15 comprises a plurality of sensing elements 151, 153, 155 and 157, a conductive assembly, a process module 17, a spacer 15u and a spacer 15v. It can be seen from FIG. 1 that, the spacers 15u and 15v are disposed between the panel 11 and the substrate 13 to form a space adapted to receive the sensing elements. In this preferred embodiment, the spacers 15u and 15v may each be an elastic material.

The sensing elements 151, 153, 155 and 157 are disposed between the panel 11 and the substrate 13 and electrically connected to the process module 17 via the conductive assembly. The process module 17 is configured to store position data of each of the sensing elements opposite to the panel 11. The position data is used to record positional coordinates of the respective sensing element in the displayer 1. Unlike the conventional structure, every several adjacent ones of the sensing elements form a sensing area opposite to the panel 11, so a plurality of sensing areas are formed on the panel 11. Each of the sensing elements generates a touch voltage in response to a touch on the sensing areas. The process module 17 is configured to receive the touch voltages and calculate a touch position of the touch opposite to the panel 11 according to the position data and the touch voltages.

Specifically, from sensing elements 151, 153, 155 and 157 shown in FIG. 1, take the sensing element 151 as an example. The sensing element 151 comprises a stuff 151a, a strength concentrator 151b and a strength sensor 151c. The stuff 151a is disposed on the first surface 111 of the panel 11 and the strength sensor 151c is disposed on the substrate surface 131, so the stuff 151a, the strength concentrator 151b and the strength sensor 151c are sequentially stacked between the first surface 111 of the panel 11 and the substrate surface 131. Additionally, in this preferred embodiment, the strength sensor 151c is made of a Polymer which may demonstrate varied resistance when being pressed, the stuff 151a is made of a Poron, and the strength concentrator 151b is made of steel or a rigid plastic, although they are not merely limited thereto. Similarly, the sensing element 153 comprises a stuff 153a, a strength concentrator 153b and a strength sensor 153c, the sensing element 155 comprises a stuff 155a, a strength concentrator 155b and a strength sensor 155c. The sensing element 157 comprises a stuff 157a, a strength concentrator 157b and a strength sensor 157c. Structures and materials of structural elements of the sensing elements 153, 155 and 157 are just the same as those of the sensing element 151, and thus will not be further described again herein. It should be noted that, each of the sensing elements is provided with an identical height between the panel 11 and the substrate 13 by the respective stuffs, the strength concentrator is configured to concentrate and conduct the touch to the strength sensor, and the strength sensor is configured to generate the touch voltage in response to the touch.

Figure 2:
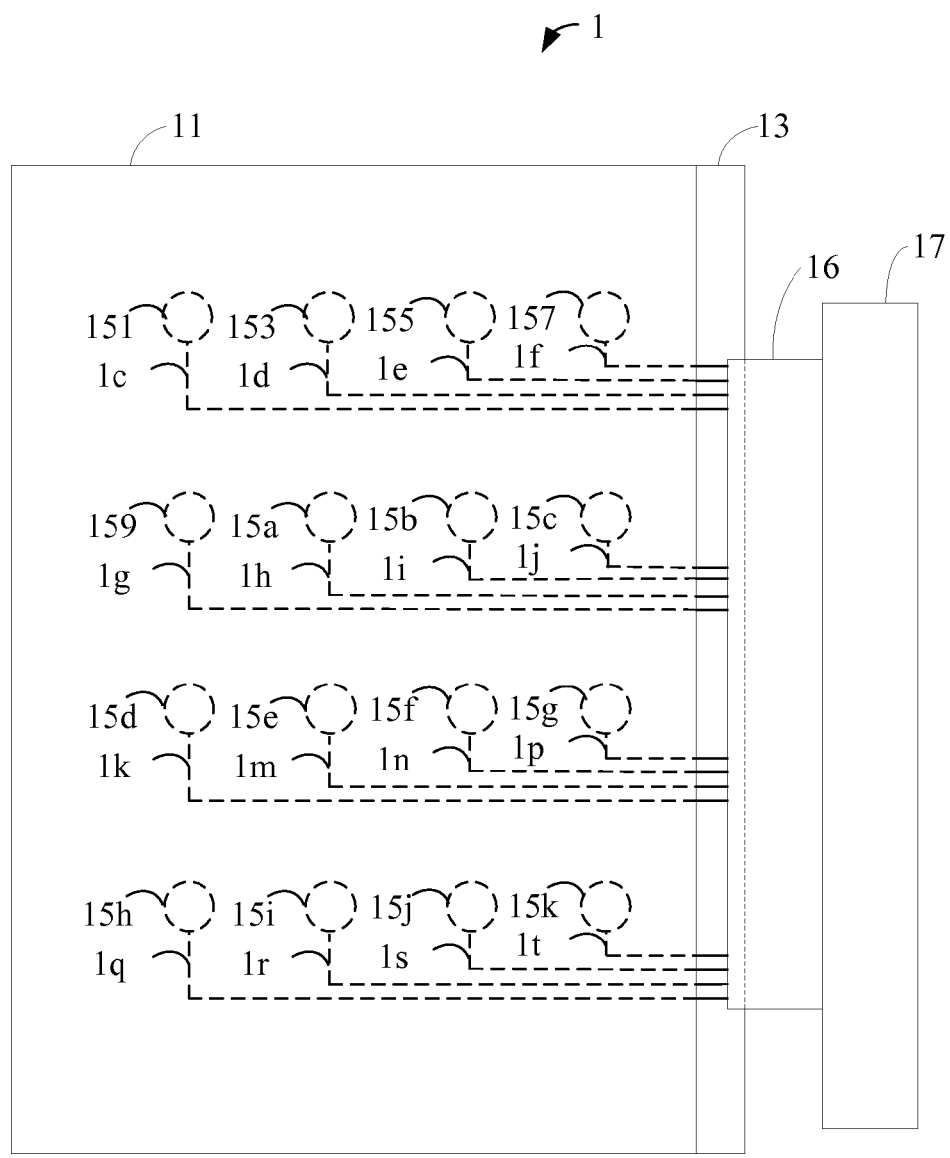
FIG. 2 is a top view of the display according to the first preferred embodiment of the present invention.

Please refer to FIG. 2, which is a top view of a displayer 1. From FIG. 2, besides the aforesaid panel 11, substrate 13, and sensing elements 151, 153, 155, 157, the displayer 1 further comprises sensing elements 159, 15a, 15b, . . . , 15k, and the conductive assembly comprising conducting wires 1c to 1k, conducting wires 1m and 1n, conducting wires 1p to 1t, and a flexible printed circuit board (PCB) 16. The sensing elements are electrically connected to the process module 17 via the conducting wires and the flexible PCB 16.

Figure 3:
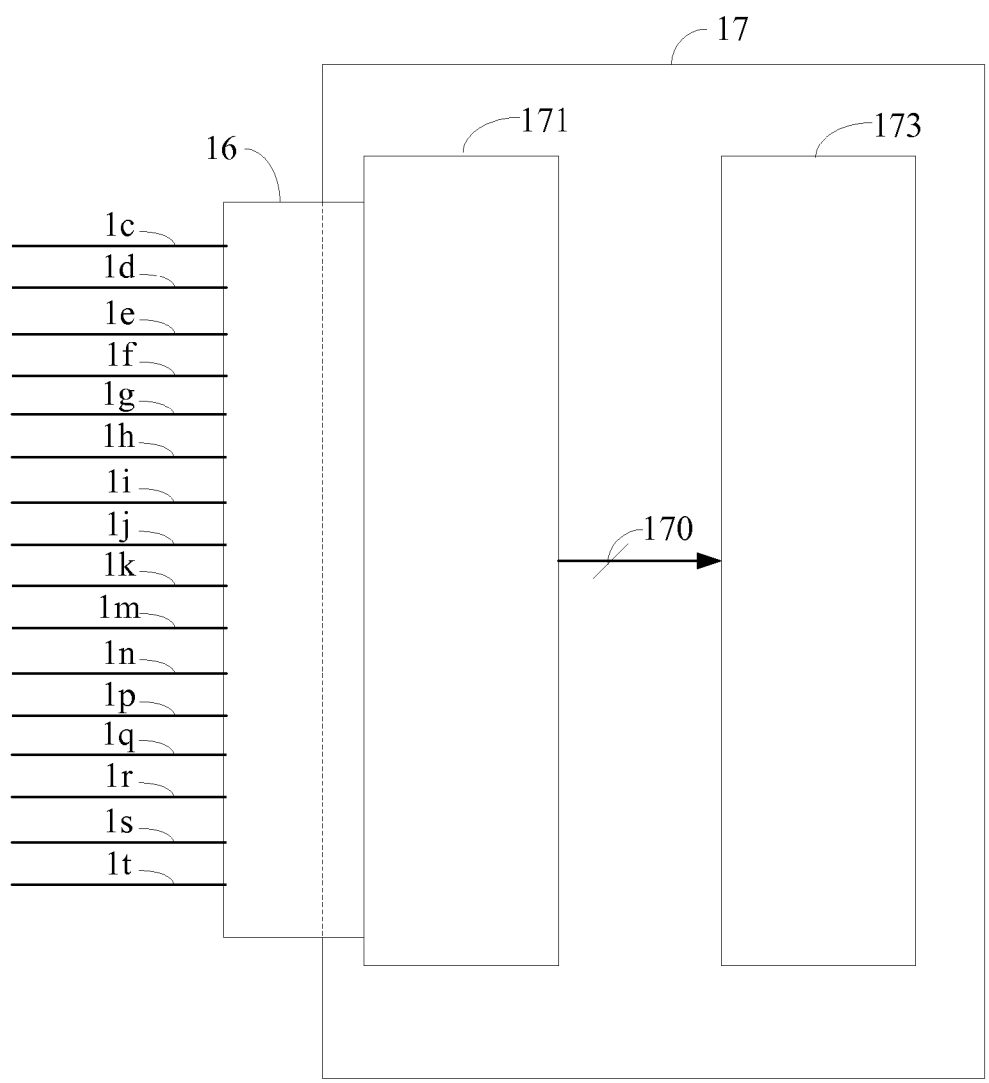
FIG. 3 is a schematic view of a process module in the first preferred embodiment of the present invention.

To illustrate the structure and functionality of the process module 17 more clearly, please refer to FIG. 3, which is a schematic view of the process module 17. The process module 17 comprises a transformation unit 171 and a control unit 173. In this embodiment, the transformation unit 171 is an analog to digital (A/D) processor, and the control unit 173 is a microprocessor, although they are not merely limited thereto. Via the conducting wires 1c to 1k, conducting wires 1m and 1n, and conducting wires 1p to 1t, the flexible PCB 16, the transformation unit 171 is electrically connected to the sensing elements to receive the touch voltages therefrom. Then the transformation unit 171 transforms each of the touch voltages into a digital signal (for example, transforming a touch voltage into a digital signal 170). The control unit 173, which is electrically connected to the transformation unit 171, is configured to store the position data, receive the digital signals 170, and calculate the at least one touch position according to the position data and the digital signals 170.

In more detail, the control unit 173 of the process module 17 may select at least one selected area from the sensing areas in response to the digital signals 170 and calculate the at least one touch position in the at least one selected area. The at least one selected area is one of the sensing areas that has a peak voltage value, and the peak voltage value is determined by: calculating an area voltage value of each of the sensing areas, wherein the area voltage value is an average value of each touch voltage of each sensing element in each sensing area; and selecting the adjacent sensing area with the greatest area voltage value among the sensing areas.

For purpose of description, it is assumed that each of the sensing areas is determined by four adjacent sensing elements in this embodiment. For example, the first sensing area is formed by the sensing elements 151, 153, 159 and 15a, the second sensing area is formed by the sensing elements 15e, 15i, 15f and 15j, and so on.

When the first sensing area receives a touch, each of the sensors in the displayer 1 generates a touch voltage to the transformation unit 171 of the process module 17 in response to the touch. The transformation unit 171 then transforms each of the received touch voltages into a digital signal. As the touch takes place in the first sensing area formed by the sensing elements 151, 153, 159 and 15a, the control unit 173 of the process module 17 can learn from the digital signals that the area voltage value of the first sensing area (i.e., an average value of touch voltages generated by the sensing elements 151, 153, 159 and 15a respectively) ranks the greatest one among the sensing areas around the first sensing area.

At this point, the control unit 173 determines that the first sensing area has the peak voltage value and, therefore, is selected as a selected area. Then, according to the touch voltages (known from the digital signals) generated by the sensing elements 151, 153, 159 and 15a and the position data thereof and through, for example, a mechanical equilibrium method or other similar methods, the control unit 173 calculates a touch position of the touch opposite to the panel 11 for use in subsequent control of the handheld device.

It should be noted that, as compared to the prior art, the present invention provides a multi-touch function. More specifically, when the first and second sensing areas receive a touch respectively and simultaneously, each of the sensors in the displayer 1 generates a touch voltage to the process module 17 in response to the two touches. As the touches take place in the first sensing area formed by the sensing elements 151, 153, 159, 15a and the second sensing area formed by the sensing area formed by the sensing elements 15e, 15i, 15f, 15j respectively, the first and the second sensing areas share no overlapped sensing element, the area voltage value of the first sensing area (i.e., an average value of touch voltages generated by the sensing elements 151, 153, 159, 15a respectively) ranks the greatest one among the sensing areas around the first sensing area and the area voltage value of the second sensing area (i.e., an average value of touch voltages generated by the sensing elements 15e, 15i, 15f, 15j respectively) ranks the greatest one among the sensing areas around the second sensing area.

At this point, the control unit 173 determines that both the first and second sensing areas have the peak voltage values and, therefore, are selected as selected areas. Then, according to the touch voltages (known from the digital signals) generated by the sensing elements 151, 153, 159 and 15a and the position data thereof, the control unit 173 calculates a touch position, opposite to the panel 11, of the touch taking place in the first sensing area. Also, according to the touch voltages (known from the digital signals) generated by the sensing elements 15e, 15i, 15f and 15j and the position data thereof, the control unit 173 calculates a touch position, opposite to the panel 11, of the touch taking place in the second sensing area. Thus, the displayer 1 is able to accomplish the multi-touch function.

As described above, the sensing structure of the present invention has a plurality of sensing elements disposed between the panel and the substrate to form a plurality of sensing areas on the panel. Each of the sensing areas is adapted to receive a touch. With this arrangement, the displayer comprising the sensing structure is able to accomplish the multi-touch function. Moreover, the present invention eliminates occurrence of the frictional force by disposing a spacer between the substrate and the panel to form a space for receiving the sensing elements. Further, as the displayer is divided into a plurality of sensing areas and calculates a touch position according to information from each of the sensing areas, the accuracy of sensing a touch position gets effectively improved as compared to the prior art, thereby overcoming the drawbacks that the conventional displayer only provides the single-touch function and delivers poor sensing accuracy.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A process module for use in a sensing structure of a displayer to determine at least one touch position in the displayer, the sensing structure having a plurality of sensing elements for forming a plurality of sensing areas, the process module comprising:

a transformation unit, being configured to receive touch voltages from the sensing elements and transform each of the touch voltages into a digital signal; and a control unit, being electrically connected to the transformation unit and configured to select at least one selected area from the sensing areas in response to the digital signals and calculate the at least one touch position of the at least one selected area, wherein the at least one selected area is the one of the sensing areas having a peak voltage value, the peak voltage value is determining by:

calculating an area voltage value of each of the sensing areas, wherein the area voltage value is an average value of each touch voltage of each sensing element in each sensing area; and selecting an adjacent sensing area with a greatest area voltage value from the sensing areas.

2. A sensing structure for use in a displayer having a panel to determine at least one touch position in the displayer, the sensing structure comprising:

a substrate;

a plurality of sensing elements, disposed between the substrate and the panel for forming a plurality of sensing areas; and a process module, electrically connected to the sensing elements, the process module comprising:

a transformation unit, being configured to receive touch voltages from the sensing elements and transform each of the touch voltages into a digital signal; and a control unit, being electrically connected to the transformation unit and configured to select at least one selected area from the sensing areas in response to the digital signals and calculate the at least one touch position of the at least one selected area, wherein the at least one selected area is the one of the sensing areas having a peak voltage value, the peak voltage value is determining by:

calculating an area voltage value of each of the sensing areas, wherein the area voltage value is an average value of each touch voltage of each sensing element in each sensing area; and selecting an adjacent sensing area with a greatest area voltage value from the sensing areas.

3. The sensing structure of claim 2, wherein each of the sensing elements generates the touch voltage in response to at least one touch on the sensing areas.

4. The sensing structure of claim 3, wherein the substrate has a substrate surface, the panel has a first surface opposite to the substrate surface and a second surface corresponding to the first surface, each sensing element comprising:

a stuff, being disposed on the first surface;

a strength concentrator; and a strength sensor, being disposed on the substrate surface, and the stuff, the strength concentrator and the strength sensor stack between the first surface and the substrate surface.

5. The sensing structure of claim 4, wherein each sensing element has an identical height between the panel and the substrate by the corresponding stuff, the strength concentrator is configured to concentrate and conduct the touch to the strength sensor, the strength sensor is configured to generate the touch voltage in response to the touch.

6. The sensing structure of claim 4, wherein the material of the strength sensor is a Polymer.

7. The sensing structure of claim 4, wherein the material of the strength concentrator is a steel.

8. The sensing structure of claim 2, further comprising a spacer, the spacer being disposed between the panel and the substrate, so as to form a space being adapted to receive the sensing elements.

9. The sensing structure of claim 8, wherein the spacer is an elastic material.

10. A displayer, comprising:
a panel having a display medium layer and capable of displaying a frame; and
a sensing structure being disposed opposite to a viewing side of the panel, the sensing structure comprising:
a substrate;
a plurality of sensing elements, disposed between the substrate and the panel for forming a plurality of sensing areas; and
a process module, being electrically connected to the sensing elements;
wherein each of the sensing elements generates a touch voltage in response to at least one touch on the sensing areas, the process module is configured to receive the touch voltages, and calculate at least one touch position of the at least one touch opposite to the panel according to the touch voltages;
wherein the substrate has a substrate surface, the panel has a first surface opposite to the substrate surface and a second surface corresponding to the first surface, each sensing element comprising:
a stuff, being disposed on the first surface;
a strength concentrator; and
a strength sensor, being disposed on the substrate surface, and the stuff, the strength concentrator and the strength sensor stack between the first surface and the substrate surface.

11. The displayer of claim 10, wherein each sensing element has an identical height between the panel and the substrate by the corresponding stuff, the strength concentrator is configured to concentrate and conduct the touch to the strength sensor, the strength sensor is configured to generate the touch voltage in response to the touch.

12. The displayer of claim 10, wherein the material of the strength sensor is a Polymer.

13. The displayer of claim 10, wherein the material of the strength concentrator is a steel.

14. The displayer of claim 10, further comprising a spacer, the spacer being disposed between the panel and the substrate, so as to form a space being adapted to receive the sensing elements.

15. The displayer of claim 14, wherein the spacer is an elastic material.

16. The displayer of claim 10, wherein the process module comprises:
a transformation unit, being configured to receive the touch voltages and transform each of the touch voltages into a digital signal; and
a control unit, being electrically connected to the transformation unit, the control unit being configured to receive the digital signals and calculate the at least one touch position according to the digital signals.

17. The displayer of claim 16, wherein the control unit of the process module selects at least one selected area from the sensing areas in response to the digital signals and calculates the at least one touch position of the at least one selected area, the at least one selected area is the one of the sensing areas having a peak voltage value, the peak voltage value is determined by:
calculating an area voltage value of each of the sensing areas, wherein the area voltage value is an average value of each touch voltage of each sensing element in each sensing area; and selecting an adjacent sensing area with a greatest area voltage value from the sensing areas.

* * * * *